US011286649B2

(12) United States Patent
Graves

(10) Patent No.: US 11,286,649 B2
(45) Date of Patent: Mar. 29, 2022

(54) ESTIMATING YAW OF ROTATING BODY USING VELOCITY MEASUREMENTS

(71) Applicant: Caterpillar Inc., Deerfield, IL (US)

(72) Inventor: Nolan A. Graves, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 223 days.

(21) Appl. No.: 16/510,333

(22) Filed: Jul. 12, 2019

(65) Prior Publication Data

US 2021/0010245 A1 Jan. 14, 2021

(51) Int. Cl.
*E02F 9/26* (2006.01)
*G05D 1/02* (2020.01)

(52) U.S. Cl.
CPC ............. *E02F 9/264* (2013.01); *G05D 1/027* (2013.01); *G05D 1/0272* (2013.01); *G05D 1/0278* (2013.01)

(58) Field of Classification Search
CPC ....... E02F 9/264; G05D 1/027; G05D 1/0272; G05D 1/0278
See application file for complete search history.

(56) References Cited

U.S. PATENT DOCUMENTS

| | | | |
|---|---|---|---|
| 4,405,986 A | 9/1983 | Gray | |
| 5,906,655 A | 5/1999 | Fan | |
| 7,835,863 B2 | 11/2010 | Lokshin et al. | |
| 8,265,826 B2 | 9/2012 | Feller et al. | |
| 8,996,310 B1 | 3/2015 | Zhang et al. | |
| 10,024,977 B1 | 7/2018 | Schneider et al. | |
| 2012/0173086 A1* | 7/2012 | Takenaka | B62K 11/007 701/48 |
| 2018/0016769 A1 | 1/2018 | Omelchenko | |
| 2019/0094388 A1* | 3/2019 | Gorcke | G01C 15/06 |

* cited by examiner

*Primary Examiner* — Rami Khatib
*Assistant Examiner* — Shahira Baajour
(74) *Attorney, Agent, or Firm* — Leydig, Voit & Mayer, Ltd.

(57) ABSTRACT

A method for estimating a yaw (or heading) of a rotating body of a machine is disclosed. The method may include obtaining measurements related to a velocity of a global navigation satellite system (GNSS) antenna coupled to the rotating body based on a motion state associated with the machine satisfying one or more conditions, calculating a first unit vector of a lever arm from a rotation axis to the GNSS antenna, and calculating a second unit vector orthogonal to the one or more measurements related to the velocity of the GNSS antenna in a direction towards the rotation axis (e.g., based on a velocity of another GNSS antenna coupled to the rotating body and/or a yaw rate measurement obtained by an inertial measurement unit). Accordingly, the yaw of the rotating body may be estimated based on a rotation angle between the first unit vector and the second unit vector.

20 Claims, 6 Drawing Sheets

ESTIMATING YAW OF ROTATING BODY USING VELOCITY MEASUREMENTS

TECHNICAL FIELD

The present disclosure relates generally to machines having rotating bodies and, for example, to estimating yaw of a rotating body using velocity measurements.

BACKGROUND

Machines such as excavators, rope shovels, mining shovels, backhoes, and/or the like may be configured for rotational movement (e.g., to move material between locations at a work site). For example, a machine with rotational capabilities may dig material at a first location such as a dig site with a material-engaging work implement and then rotate the work implement to a second location such as a dump site where the material dug at the first location is dumped or otherwise unloaded. In general, these machines may operate in an autonomous, semi-autonomous, and/or operator-controlled manner to perform these tasks in response to commands generated as part of a work plan to perform operations at the work site, such as operations related to mining, earthmoving, construction, industrial activities, and/or the like.

In some cases, a pose of the machine, the work implement, and/or the like includes parameters such as position, heading, orientation, velocity, acceleration, and/or the like that are important to determine with high accuracy for control and positioning the machine. This can be especially challenging in a machine with rotational capabilities, as the heading (or yaw) of a rotating body can differ from a direction in which the machine is travelling. This creates a risk that the machine may carry out operations in a manner that deviates from the work plan or collide with an obstacle (e.g., another machine, an object, a terrain feature, and/or the like). Accordingly, for a machine having a rotating body or rotational capabilities, yaw is typically estimated using two global navigation satellite system (GNSS) receivers with antennas that are positioned at fixed locations relative to one another. The two GNSS receivers each provide a position measurement, and a vector is calculated between the two antennas. Yaw is adjusted for lever arms from a center of rotation to the two antennas, which results in a final yaw estimation, as follows:

$$\psi = a\tan 2(v_{e1}-v_{e2}, v_{n1}-v_{n2}) - a\tan 2(\ell_{y1}-\ell_{y2}, \ell_{x1}-\ell_{x2})$$

where $\psi$ is the yaw estimation, $v_{e1}$ and $v_{n1}$ are easting and northing velocities of the first antenna, $v_{e2}$ and $v_{n1}$ are easting and northing velocities of the second antenna, $\ell_{x1}$ and $\ell_{y1}$ are x-y coordinates of a lever arm for the first antenna, and $\ell_{x2}$ and $\ell_{y2}$ are x-y coordinates of a lever arm for the second antenna. In general, the typical yaw estimation method may be subject to an error determined as follows:

$$\psi_{error} = \tan^{-1}\left(\frac{v_{error\perp}}{v}\right)$$

where $\psi_{error}$ is an error in the yaw estimate, $v$ is the position vector between the two antennas, and $v_{error\perp}$ is an error between the antennas orthogonal to the position vector. Accordingly, in the typical yaw estimation method, the error in the yaw estimate increases as the position measurement accuracy decreases (e.g., as a magnitude of the numerator, $v_{error\perp}$, increases), and the error in the yaw estimate also increases as the distance separating the two antennas decreases (e.g., as a magnitude of the denominator, $v$, decreases). The typical yaw estimation method therefore tends to have an unacceptably high error if position measurement accuracy is low (e.g., where the GNSS receivers are mid-precision or low-precision receivers that provide greater than ~50-centimeter accuracy, in work sites that may be poor signal environments, such as deep pit mines or urban areas where multipath issues may cause satellite signals to reflect off buildings or other obstacles, and/or the like). Furthermore, because the error in the yaw estimate increases as the distance separating the two antennas decreases, the typical yaw estimation method has an unacceptably high error if the distance separating the two antennas is small (e.g., on a smaller machine where the two antennas are separated by a few meters or less). Moreover, the typical yaw estimation method depends on position measurements from two GNSS receivers/antennas, which may not be cost-effective in some cases.

One attempt to compute a position and an orientation for a blade of a motor grader is disclosed in U.S. Patent Application No. 2018/0016769 ("the '769 application"). In particular, the '769 application discloses at least one GNSS antenna and at least one inertial measurement unit (IMU) that are mounted on the motor grader. The '769 application further discloses that GNSS navigation signals are received with each GNSS antenna, and a position of each GNSS antenna is computed. Three orthogonal accelerations and three orthogonal angular rotation rates are measured with each IMU. The '769 application further states that a blade position and a blade orientation are computed, based at least in part on the GNSS and IMU measurements.

While the method of the '769 application may compute a position and an orientation for a blade of a motor grader based on GNSS and IMU measurements, as described above, the '769 application does not address techniques to determine the position and orientation (including yaw) of a rotating body, an implement that may be coupled to a rotating body, and/or the like.

The yaw estimation techniques of the present disclosure solve one or more of the problems set forth above and/or other problems in the art.

SUMMARY

According to some implementations, a method may include: determining a motion state associated with a machine having a support structure and a body that can rotate about a rotation axis, wherein the motion state includes information related to rotation of the body about the rotation axis and information related to movement of the support structure; obtaining one or more measurements related to a velocity of a first global navigation satellite system (GNSS) antenna coupled to the body of the machine based on the motion state associated with the machine satisfying one or more conditions; calculating a first unit vector of a lever arm from the rotation axis to the first GNSS antenna and a second unit vector orthogonal to the one or more measurements related to the velocity of the first GNSS antenna, wherein a direction of the second unit vector is based on a direction of a yaw rate that is determined based on one or more of a velocity of a second GNSS antenna coupled to the body of the machine, a yaw rate measurement obtained by an inertial measurement unit coupled to the body of the machine, or information provided by one or more sensors that monitor an operational state of the machine; and estimating a yaw of the body of the machine based on a rotation angle between the first unit vector and the second unit vector.

According to some implementations, a system may include one or more memories; and one or more processors, communicatively coupled to the one or more memories, configured to: determine a motion state associated with a machine having a body that can rotate about a rotation axis; obtain one or more measurements related to a velocity of a first GNSS antenna coupled to the body of the machine based on the motion state associated with the machine satisfying one or more conditions, wherein the one or more conditions include that the body is rotating about the rotation axis; calculate a first unit vector of a lever arm from the rotation axis to the first GNSS antenna and a second unit vector orthogonal to the one or more measurements related to the velocity of the first GNSS antenna, wherein a direction of the second unit vector is based on a direction of a yaw rate that is determined based on one or more of a velocity of a second GNSS antenna coupled to the body of the machine or a yaw rate measurement obtained by an inertial measurement unit coupled to the body of the machine; and estimate a yaw of the body of the machine based on a rotation angle between the first unit vector and the second unit vector.

According to some implementations, a machine may include: a body that can rotate about a rotation axis; a support structure capable of movement; and a system including one or more devices configured to: determine a motion state associated with the machine, wherein the motion state includes one or more of information related to rotation of the body about the rotation axis or information related to movement of the support structure; obtain one or more measurements related to a velocity of a first GNSS antenna coupled to the body of the machine based on the motion state associated with the machine satisfying one or more conditions; calculate a first unit vector of a lever arm from the rotation axis to the first GNSS antenna and a second unit vector orthogonal to the one or more measurements related to the velocity of the first GNSS antenna, wherein a direction of the second unit vector is determined based on one or more of a velocity of a second GNSS antenna coupled to the body of the machine or a yaw rate measurement obtained by an inertial measurement unit coupled to the body of the machine; and estimate a yaw of the body of the machine based on a rotation angle between the first unit vector and the second unit vector.

DETAILED DESCRIPTION

This disclosure relates to a yaw estimation method for a rotating body of a machine. The yaw estimation method has universal applicability to any machine with rotational capabilities utilizing such a yaw estimation method. The term "machine" may refer to any machine that performs an operation associated with an industry such as, for example, mining, construction, farming, transportation, or any other industry. As some examples, the machine may be a vehicle, an excavator, a rope shovel, a hydraulic mining shovel, a crane, a robot arm, a backhoe loader, a cold planer, a wheel loader, a compactor, a feller buncher, a forest machine, a forwarder, a harvester, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and controlled or otherwise operated based on a pose of the one or more implements, which may be determined based on the estimated yaw of the rotating body.

Figure 1:
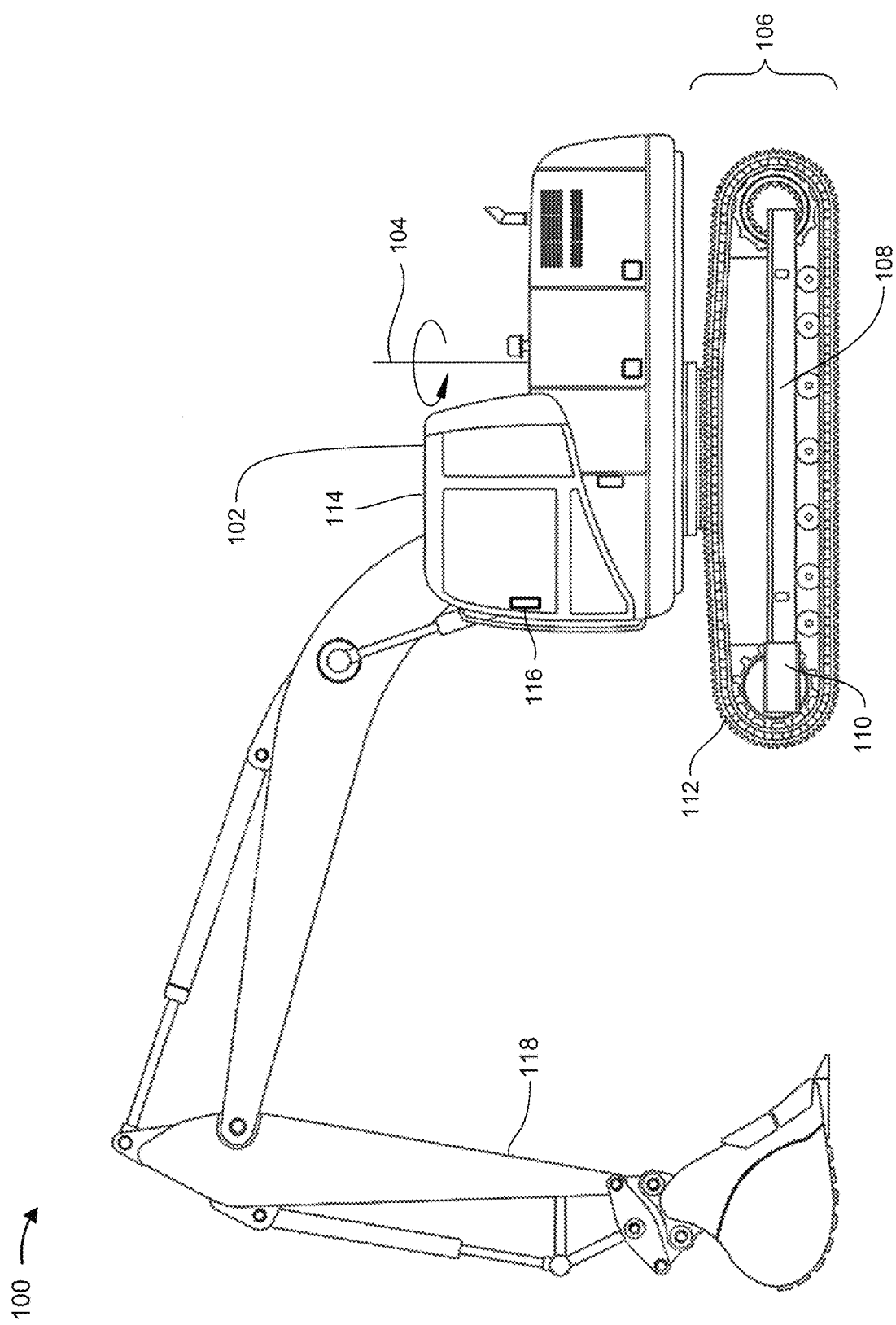
FIG. 1 is a diagram of an example machine described herein.

FIG. 1 is a diagram of an example machine 100 described herein. The machine 100 is shown in FIG. 1 as an excavator but may include any type of machine that has rotational capabilities.

As shown, the machine 100 may have a body 102 that can rotate about a rotation axis 104 and a support structure 106 that includes a drive system 108, a drive shaft 110, and a traction system 112. As shown, the body 102 includes an operator station 114 including operator controls 116 that can be used to operate the machine 100. For example, the operator controls 116 may include one or more input devices (e.g., buttons, keypads, touchscreens, trackballs, joy sticks, levers, pedals, steering mechanisms, and/or the like) and/or output devices (e.g., displays, illumination indicators, speakers, and/or the like). The machine 100 also has a power source configured to supply power to the machine 100 (e.g., a natural gas engine, such as a high power natural gas engine, an electric motor, and/or the like). The power source may be operably arranged to receive control signals from the operator controls 116 in the operator station 114. Additionally, the power source may be operably arranged with the drive system 108, an implement 118 coupled to the body 102, and/or one or more rotational members to selectively operate the drive system 108, to selectively operate the implement 118, and/or to selectively rotate the body 102 about the rotation axis 104 according to control signals (e.g., received from the operator controls 116). The power source may provide operating power for the propulsion of the drive system 108, the operation of the implement 118, and/or the rotation of the body 102 about the rotation axis 104 (e.g., via the drive system 108, the drive shaft 110, and/or the like).

The drive system 108 may be operably arranged with the power source to selectively propel the machine 100 via control signals from the operator controls 116. The drive system 108 may be operably connected to a plurality of ground-engaging members, such as traction system 112, as shown, which may be movably connected to the machine 100 and the body 102 through axles, drive shafts, a transmission, and/or other components and which may be movably connected to the power source and the drive system 108 via the drive shaft 110. The traction system 112 may be provided in the form of a track-drive system, a wheel-drive system, and/or any other type of drive system configured to propel the machine 100 forward and/or backward. For example, in some implementations, the traction system 112 may include a pair of tracks that can be independently operated in a forward or reverse direction in order to move the machine 100 forward, move the machine 100 backward, turn or otherwise change a travel direction, and/or the like. The drive system 108 may be operably arranged with the power source to selectively operate the implement 118, which may be movably connected to the machine 100, the body 102, and the drive system 108.

The power source and the drive system 108 may include an engine and a transmission. The engine may be any type of engine suitable for performing work using the machine 100, such as an internal combustion engine, a diesel engine, a gasoline engine, a gaseous fuel-powered engine, a natural gas engine, a high power natural gas engine, and/or the like. The transmission may transfer power from the engine to the traction system 112 and/or the implement 118. The transmission may also provide various gear ratios that enable the machine 100 to travel at a relatively wide range of speeds and/or conditions via the traction system 112, and/or that enable the use of the implement 118 to perform work.

The implement 118 may be operably arranged with the drive system 108 such that the implement 118 is movable through control signals transmitted from the operator controls 116 to the drive system 108, the drive shaft 110, and/or the like. The illustrated implement 118 is an excavator bucket. Other embodiments can include any other suitable implement for various tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

As further described below, the machine 100 may include a yaw estimation device that can estimate a yaw of the body 102 about the rotation axis 104 based on one or more velocity measurements. For example, the machine 100 may include one or more global navigation satellite system (GNSS) antennas positioned at fixed locations on the body 102, an inertial measurement unit (IMU) configured to measure an angular rate, orientation, and/or the like of the body 102 (e.g., using one or more accelerometers, gyroscopes, magnetometers, and/or other sensors), and/or the like. Accordingly, when a motion state of the machine 100 satisfies one or more conditions (e.g., the body 102 is rotating and/or rotating at a speed that satisfies a threshold value, the support structure 106 is stationary and/or moving at a speed that satisfies a threshold value, and/or the like), the yaw estimation device may use information obtained from the one or more GNSS antenna, the IMU, and/or the like to estimate the yaw of the rotating body 102.

As indicated above, FIG. 1 is provided as an example. Other examples may differ from what is described in connection with FIG. 1.

FIGS. 2-5 are diagrams associated with various example implementations of yaw estimation for a rotating body of a machine described herein. For the purposes of FIGS. 2-5, the machine has a body 102 that can rotate about a rotation axis 104, a support structure that can cause the machine to move (e.g., via a traction system 112) independently from any rotation of the body 102 about the rotation axis, and an implement 118 coupled to the body 102 (e.g., a bucket in the illustrated example). As further shown in FIGS. 2-5, the machine includes a yaw estimation device 210 that can estimate the yaw of the body 102 (e.g., an angle of the body 102 relative to the rotation axis 104) based on one or more velocity measurements. In some implementations, the velocity measurements may be based on velocities of one or more GNSS antennas 212 that are positioned on the body 102 at fixed locations, which may be determined based on characteristics of satellite signals received by the GNSS antenna(s) 212.

For example, the velocity measurements can be based on a Doppler frequency shift of the satellite signals, which refers to a change in frequency of the satellite signals received by the GNSS antenna(s) 212 as the GNSS antenna(s) 212 and a source of the satellite signals are in motion relative to one another (e.g., based on a change in wavelength speed as the GNSS antenna(s) 212 move closer to and/or farther from one or more satellites that are transmitting the satellite signals). In another example, the velocity measurements can be based on a sample-over-sample position time differentiation technique in which a previous position of a GNSS antenna 212 at a first time is subtracted from a current position of the GNSS antenna 212 at a second time, and the difference is divided by a time between the first time and the second time. Additionally, or alternatively, the sample-over-sample position time differentiation technique can be combined with the technique based on the Doppler frequency shift, where a velocity is initially calculated based on the difference between a current position and a previous position at a previous time step, and the Doppler frequency shift is used to improve accuracy of the velocity calculation.

In any case, regardless of the particular techniques used to obtain the velocity measurements, the yaw estimation device 210 can be used to estimate a pose (e.g., position and orientation) of the implement 118 coupled to the body 102 based on the estimated yaw of the body 102 relative to the rotation axis 104 and a fixed orientation of the implement 118 relative to a position of the GNSS antenna(s) 212 (e.g., as the body 102 rotates clockwise or counter-clockwise, the implement 118 and the GNSS antenna(s) 212 remain in a fixed orientation relative to one another).

For example, as described in further detail below, the yaw estimation device 210 may estimate the yaw of the body 102 based on velocities of a pair of GNSS antennas 212-1, 212-2 that have a fixed orientation relative to one another (e.g., on opposite corners of the body 102, although the pair of GNSS antennas 212-1, 212-2 may be arranged at other suitable locations). Furthermore, when the yaw of the body 102 is estimated based on the velocities of the pair of GNSS antennas 212-1, 212-2, the pair of GNSS antennas 212-1, 212-2 may be separated by a distance that satisfies a threshold value. In this way, the pair of GNSS antennas 212-1, 212-2 may be separated by a minimum distance that enables the yaw estimation device 210 to determine a yaw rate direction (e.g., indicating whether the body 102 is rotating clockwise or counter-clockwise), which may be used in combination with velocities of the pair of GNSS antennas 212-1, 212-2 and lever arms from a center of the rotation axis 104 to the pair of GNSS antennas 212-1, 212-2 to estimate the yaw of the body 102.

In another example, as described in further detail below, the yaw estimation device 210 may estimate the yaw of the body 102 based on a velocity of a single GNSS antenna (e.g., GNSS antenna 212-1 or GNSS antenna 212-2), and an inertial measurement unit (IMU) 214 may be used to determine the yaw rate direction that indicates whether the body 102 is rotating clockwise or counter-clockwise. In this way, the yaw estimation device 210 may use the yaw rate measurement provided by the IMU 214 in combination with the velocity of the single GNSS antenna 212 and a lever arm from the center of the rotation axis 104 to the single GNSS antenna 212 to estimate the yaw of the body 102 relative to the rotation axis 104.

Figure 2:
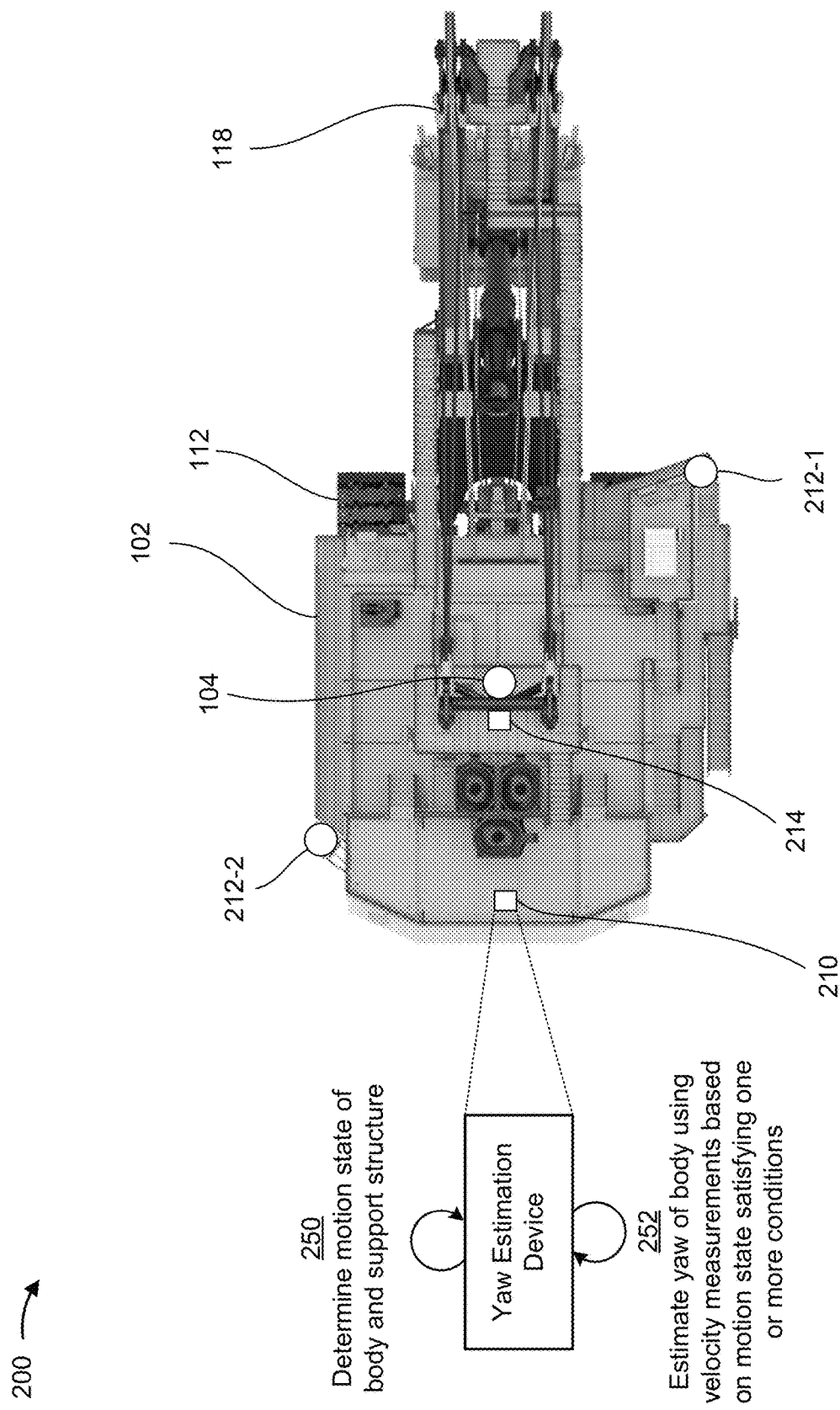
FIGS. 2-5 are diagrams associated with various example implementations of yaw estimation for a rotating body of a machine described herein.

FIG. 2 is a diagram illustrating an example 200 of the yaw estimation device 210 validating that a motion state associated with the machine satisfies one or more conditions that enable the yaw estimation device 210 to estimate the yaw of the body 102 relative to the rotation axis 104. More particularly, as shown in FIG. 2, and by reference number 250, the yaw estimation device 210 may determine a motion state of the body 102 and the support structure. With respect to the body 102, the yaw estimation device 210 may determine whether the body 102 is rotating about the rotation axis 104, and if so, a speed, rate, angular velocity, and/or the like at which the body 102 is rotating about the rotation axis 104. Furthermore, the yaw estimation device 210 may determine whether the support structure is moving, and if so, a speed or velocity at which the support structure is moving.

In some implementations, the yaw estimation device 210 may determine the motion state of the body 102 and the support structure in various ways. For example, the machine may include one or more sensors such as a rotary position sensor, a body rotary encoder, and/or the like that monitor an operational state of the machine and provide an input to the yaw estimation device 210 that indicates whether and/or how fast the body 102 is rotating. In another example, the sensors that monitor the operational state of the machine may include a tramming alarm, a backup alarm, a speedometer, and/or the like that can provide an input to the yaw estimation device 210 that indicates whether and/or how fast the support structure is moving. Additionally, or alternatively, the yaw estimation device 210 may determine the motion state of the body 102 and/or the support structure based on a yaw rate measurement provided by the IMU 214, based on a comparison between velocity measurements from the pair of GNSS antennas 212-1, 212-2 (e.g., the machine may be determined to be tramming in a forward direction or a reverse direction when the velocities from the pair of GNSS antennas 212-1, 212-2 are in the same direction), and/or the like.

As further shown in FIG. 2, and by reference number 252, the yaw estimation device 210 may estimate the yaw of the body 102 relative to the rotation axis 104 using one or more velocity measurements based on the motion state of the body 102 and/or the support structure satisfying one or more conditions. For example, the one or more conditions may be satisfied when the body 102 is rotating about the rotation axis 104 while the support structure is stationary, when the body 102 is rotating about the rotation axis 104 at a speed that satisfies a first threshold value while the support structure is moving at a speed that satisfies a second threshold value, and/or the like.

In particular, the one or more conditions may depend on the speed at which the body 102 is rotating, to ensure that noise in the velocity measurement(s) is small relative to the velocity measurement(s), which is the case when the body 102 is spinning and/or rotating fast enough that the velocity of the GNSS antenna(s) 212 is substantially greater than the accuracy of the velocity measurement. Otherwise, if the velocity measurement(s) are within the noise in the velocity measurement(s), an error in the yaw estimate may exceed acceptable parameters. In other words, an accuracy of the yaw estimate may improve as a speed at which the body 102 is rotating increases, whereby the one or more conditions may define a minimum rotation speed to ensure that the noise in the velocity measurement(s) is small relative to the velocity measurement(s).

Furthermore, the one or more conditions may depend on whether and/or how fast the support structure is moving, to ensure that a lever arm from the center of the rotation axis 104 to each GNSS antenna 212 is orthogonal to the velocity of each GNSS antenna 212, which may be the case when the body 102 is purely rotating (e.g., when the body 102 is rotating while the support structure is stationary) and/or when the support structure is moving at a speed that is sufficiently slow so as to not have a substantial impact on the direction of the velocity of each GNSS antenna 212. For example, the machine may generally move at a relatively slow speed while tramming in a forward or reverse direction, whereby the one or more conditions may define threshold values for the rotation speed of the body 102 and the movement of the support structure, to ensure that any velocity from the movement of the support structure is small relative to the velocity attributable to rotation of the body 102. In this way, the yaw estimation device 210 can infer that the velocity of each GNSS antenna 212 is orthogonal to the lever arm from the center of the rotation axis to the respective GNSS antenna(s) 212 (e.g., because the body 102 rotates about a single rotation axis 104).

Accordingly, based on determining that the motion state of the body 102 and/or the support structure satisfy the one or more conditions, the yaw estimation device 210 may use measurements that relate to a velocity for one or more GNSS antennas 212 to estimate the yaw of the body 102 relative to the rotation axis 104. For example, as mentioned above, the velocity measurements can be based on a Doppler frequency shift of satellite signals received by the GNSS antenna(s) 212, a sample-over-sample position time differentiation technique based on at least two position estimates at different times, and/or the like. Additionally, or alternatively, based on the yaw estimation device 210 determining that the body 102 is not purely rotating, rotating at a speed that fails to satisfy a threshold value, and/or the like, the yaw of the body 102 relative to the rotation axis 104 may be estimated using another technique (e.g., a dead reckoning technique based on one or more yaw rate measurements provided by the IMU 214, a position vector between the pair of GNSS antennas 212-1, 212-2, and/or the like.

Figure 3:
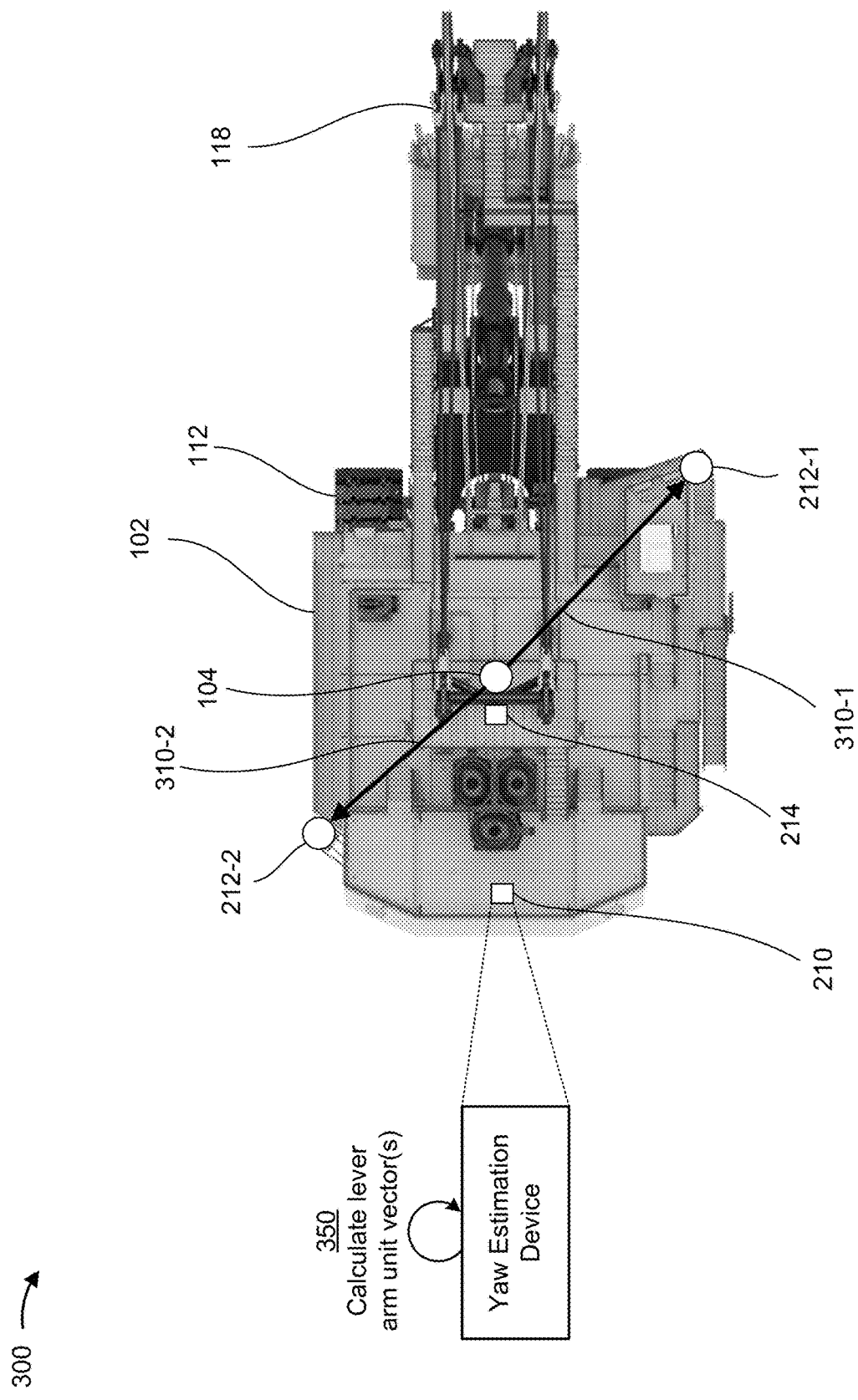

FIG. 3 is a diagram illustrating an example 300 of the yaw estimation device 210 calculating a unit vector of a lever arm 310 from a center of the rotation axis 104 to one or more GNSS antennas 212, which can be used in conjunction with velocities of the GNSS antenna(s) 212 to estimate the yaw of the body 102. For example, in FIG. 3, the machine includes a pair of GNSS antennas 212-1, 212-2 and a pair of vectors 310-1, 310-2 based on the lever arm from the center of the rotation axis 104 to the corresponding GNSS antennas 212. In general, the lever arm 310 may be determined based on one or more measurements on the machine, and may correspond to a perpendicular distance from the center of the rotation axis 104 to a line of action of a force that is applied to rotate the body 102 (e.g., based on a distance between the center of the rotation axis 104 and the fixed location(s) of the corresponding GNSS antennas 212). As mentioned above, when the body 102 is purely rotating (e.g., rotating while the support structure is stationary) and/or the support structure is moving at a velocity that is small relative to a velocity at which the body 102 is rotating, the lever arm 310 and the velocity of the corresponding GNSS antenna 212 may be orthogonal or close to orthogonal. Accordingly, as shown in FIG. 3, and by reference number 350, the yaw estimation device 210 may calculate a unit vector for each lever arm 310 to be used in estimating the yaw of the body 102, as follows:

$$\hat{\ell} = \frac{\ell}{|\ell|}$$

where $\ell$ is the lever arm 310 and $\hat{\ell}$ is the unit vector of the lever arm 310, which has the same directionality as the lever arm 310, $\ell$, and a length of one (1).

Figure 4:
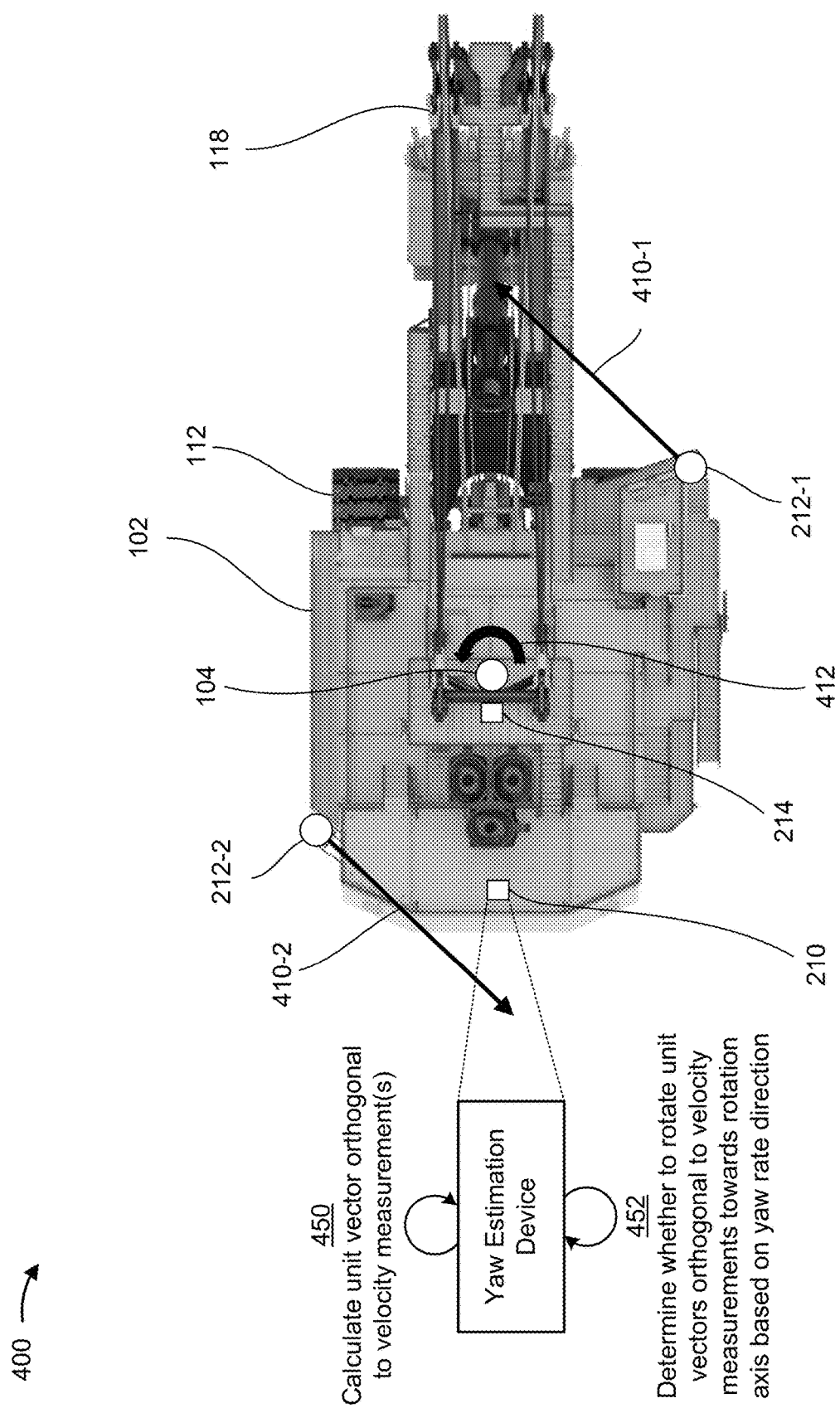

FIG. 4 is a diagram illustrating an example 400 of the yaw estimation device 210 obtaining a unit vector that is orthogonal to a velocity measurement for each GNSS antenna 212, depicted in FIG. 4 as velocity vectors 410-1, 410-2. For example, as shown by reference number 450, the yaw estimation device 210 may calculate the unit vector orthogonal to the velocity measurement 410 for each GNSS antenna 212 as follows:

$$\widehat{\vec{v}_\perp} = R_{90°} \frac{\dot{v}}{|\dot{v}|}$$

where $\dot{v}$ is the velocity measurement 410 for a particular GNSS antenna 212, $R_{90°}$ is a rotation matrix for rotating a vector 90 degrees, and $\widehat{\vec{v}_\perp}$ is the unit vector orthogonal to the velocity measurement 410, $\dot{v}$ (i.e., a vector that has a length of one (1) and a directionality that is rotated 90 degrees in a clockwise or counter-clockwise direction relative to the velocity measurement 410). In order to determine the yaw of the body 102, the unit vector orthogonal to the velocity measurement 410 should have a directionality towards the rotation axis 104. However, when the unit vector of the velocity measurement 410 is rotated 90 degrees, the unit vector that is orthogonal to the velocity measurement may have a direction that points towards the rotation axis 104 or a direction that points away from the rotation axis 104.

Accordingly, as further shown in FIG. 4, and by reference number 452, the yaw estimation device 210 may determine whether to rotate the unit vector(s) that are orthogonal to the velocity measurement(s) 410 towards the rotation axis 104 based on a yaw rate direction 412. In particular, the yaw estimation device 210 may use one or more techniques to determine whether the unit vector(s) orthogonal to the velocity measurement(s) 410 are directed towards the rotation axis 104 or whether the unit vector(s) orthogonal to the velocity measurement(s) 410 need are directed away from the rotation axis 104 and are therefore to be rotated 180 degrees.

For example, when the machine is equipped with a pair of GNSS antennas 212-1, 212-2, as in the example illustrated in FIGS. 2-5, the yaw estimation device 210 may determine the yaw rate direction 412 (e.g., whether the body 102 is rotating clockwise or counter-clockwise) based on the following expressions:

$$d_a = |(v_1 + \widehat{\vec{v}_{\perp 1}} \ell_1) - (v_2 + \widehat{\vec{v}_{\perp 2}} \ell_2)|$$

$$d_b = |(v_1 R_{180°} \widehat{\vec{v}_{\perp 1}} \ell_1) - (v_2 + R_{180°} \widehat{\vec{v}_{\perp 2}} \ell_2)|$$

where d is a distance between two vectors, $d_a$ is a length of a sum of a first vector between the pair of GNSS antennas 212-1, 212-2 and a second vector that corresponds to a difference between (i) the unit vector orthogonal to velocity measurement 410-1 multiplied by a length of lever arm vector 310-1 and (ii) the unit vector orthogonal to velocity measurement 410-2 multiplied by a length of lever arm vector 310-2, and $d_b$ is equivalent to $d_a$ except that the unit vectors orthogonal to velocity measurements 410-1 and 410-2 are rotated 180 degrees. Accordingly, given the above expressions, $\widehat{\vec{v}_\perp}$ is rotated 180 degrees if $d_b$ is less than $d_a$. Essentially, the above expressions may be used to compare a direction of the vector between the pair of GNSS antennas 212-1, 212-2 and a vector between the pair of GNSS antennas 212-1, 212-2 that is estimated from the vectors orthogonal to velocity measurements 410-1, 410-2 such that the unit vectors orthogonal to the velocity measurements 410-1, 410-2 may be flipped 180 degrees if necessary (e.g., based on the orthogonal unit vectors pointing in different directions). Accordingly, while the above expressions provide one way to determine whether the unit vectors orthogonal to the velocity measurements 410-1, 410-2 need to be rotated towards the rotation axis 104, other suitable techniques to calculate an angle between two vectors can be employed.

Additionally, or alternatively, when the machine is equipped with an IMU 214, the yaw rate direction 412 may be determined based on $$\text{sign}(\dot{\psi})$$

where $\dot{\psi}$ is a yaw rate measurement provided by the IMU 214, $\text{sign}(\dot{\psi})$ is the sign (positive or negative) of $\dot{\psi}$, and $\widehat{\vec{v}_\perp}$ is rotated 180 degrees if the yaw rate measurement, $\dot{\psi}$, is negative.

Additionally, or alternatively, the yaw estimation device 210 may determine the yaw rate direction 412 based on an input provided by one or more sensors that monitor the operational state of the machine. For example, the one or more sensors may include a rotary position sensor, a body rotary encoder, and/or the like.

Figure 5:
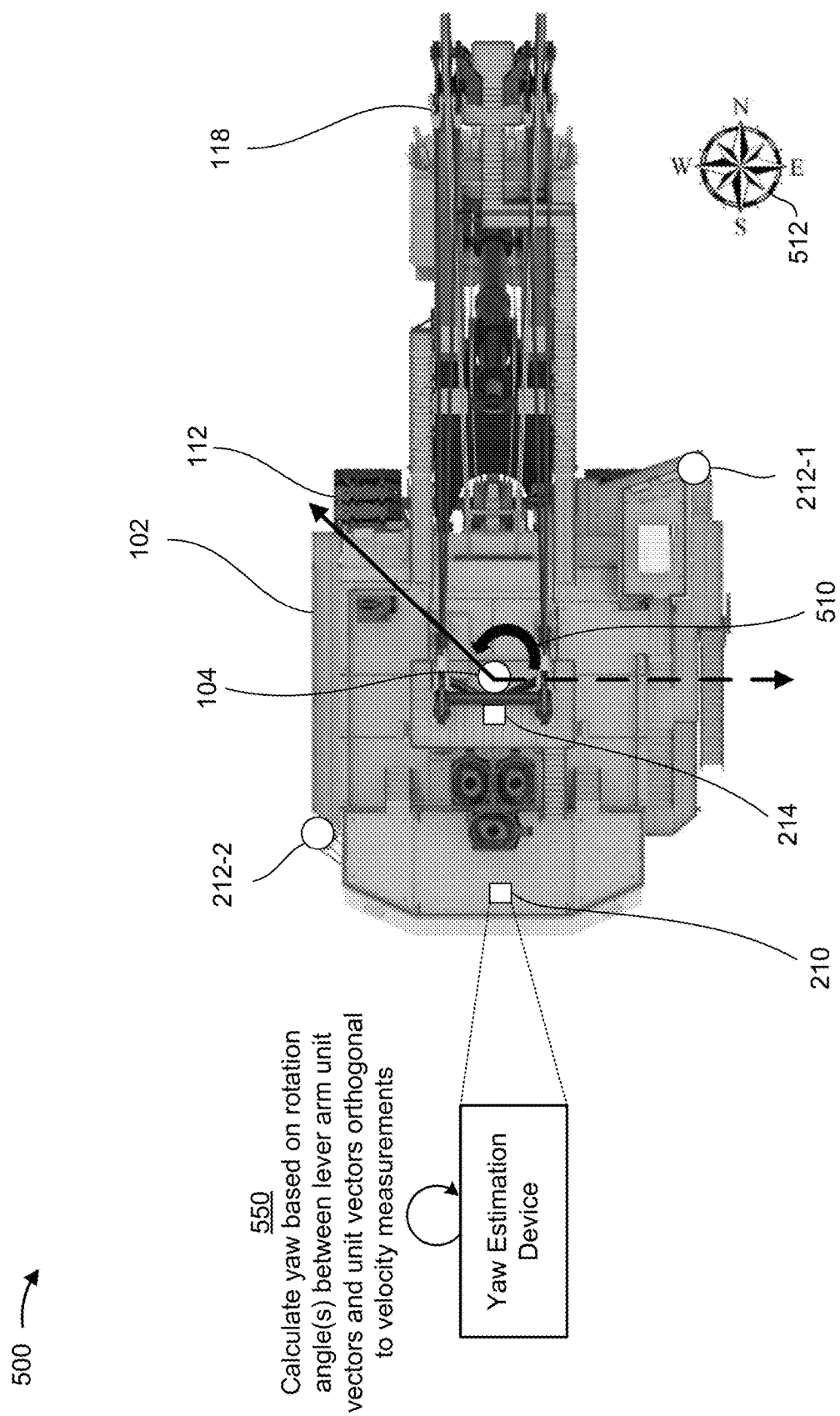

FIG. 5 is a diagram illustrating an example 500 of the yaw estimation device 210 computing a yaw estimate 510 for the body 102. As shown by reference number 512, the yaw estimate 510 may include a heading zero vector (the dashed line in FIG. 5) that points East and a heading vector (the solid line in FIG. 5) that points towards the left and/or front of the machine.

As shown in FIG. 5, and by reference number 550, the yaw estimation device 210 may calculate the yaw estimate 510 with respect to a particular GNSS antenna 212 based on a rotation angle between the unit vector of the lever arm 310 for the corresponding GNSS antenna 212 and the unit vectors that are orthogonal to the velocity measurement 410 for the corresponding GNSS antenna 212 in a direction towards the center of the rotation axis 104, as follows:

$$\psi = \text{sign}(\hat{\ell} \times \widehat{\vec{v}_\perp}) \cos^{-1}\left(\frac{\hat{\ell} \cdot \widehat{\vec{v}_\perp}}{|\hat{\ell}||\widehat{\vec{v}_\perp}|}\right)$$

where $\psi$ is the yaw estimate 510 and the other variables in the above expression are defined elsewhere herein. Furthermore, in embodiments where the machine includes two or more GNSS antennas 212 (e.g., as in the illustrated example), the yaw estimation device 210 may calculate a rotation angle between the unit vector of the lever arm 310 for each GNSS antenna 212 and the unit vector orthogonal to the velocity measurement 410 for each GNSS antenna 212, and the yaw estimate 510 may be a mean of the rotation angles calculated for each GNSS antenna 212, as follows:

$$\psi = \frac{\sum \psi_n}{n}$$

$\psi_n$ is the rotation angle between the unit vector of the lever arm 310 for a given GNSS antenna 212-n and the unit vector orthogonal to the velocity measurement 410 for the given GNSS antenna 212, and n is a quantity of the GNSS antennas 212.

As indicated above, FIGS. 2-5 are provided as one or more examples. Other examples may differ from what is described in connection with FIGS. 2-5. For example, while techniques are described herein to estimate the yaw of the body 102 based on velocity measurements that are obtained based on characteristics of satellite signals received at one or more GNSS antenna 212, any suitable velocity measurements can be used to estimate the yaw of the body 102 (e.g., the GNSS antenna 212 can be integrated with or positioned in close proximity to an IMU 214 that can estimate the velocity of the GNSS antenna 212 without reliance on satellite signals).

Figure 6:
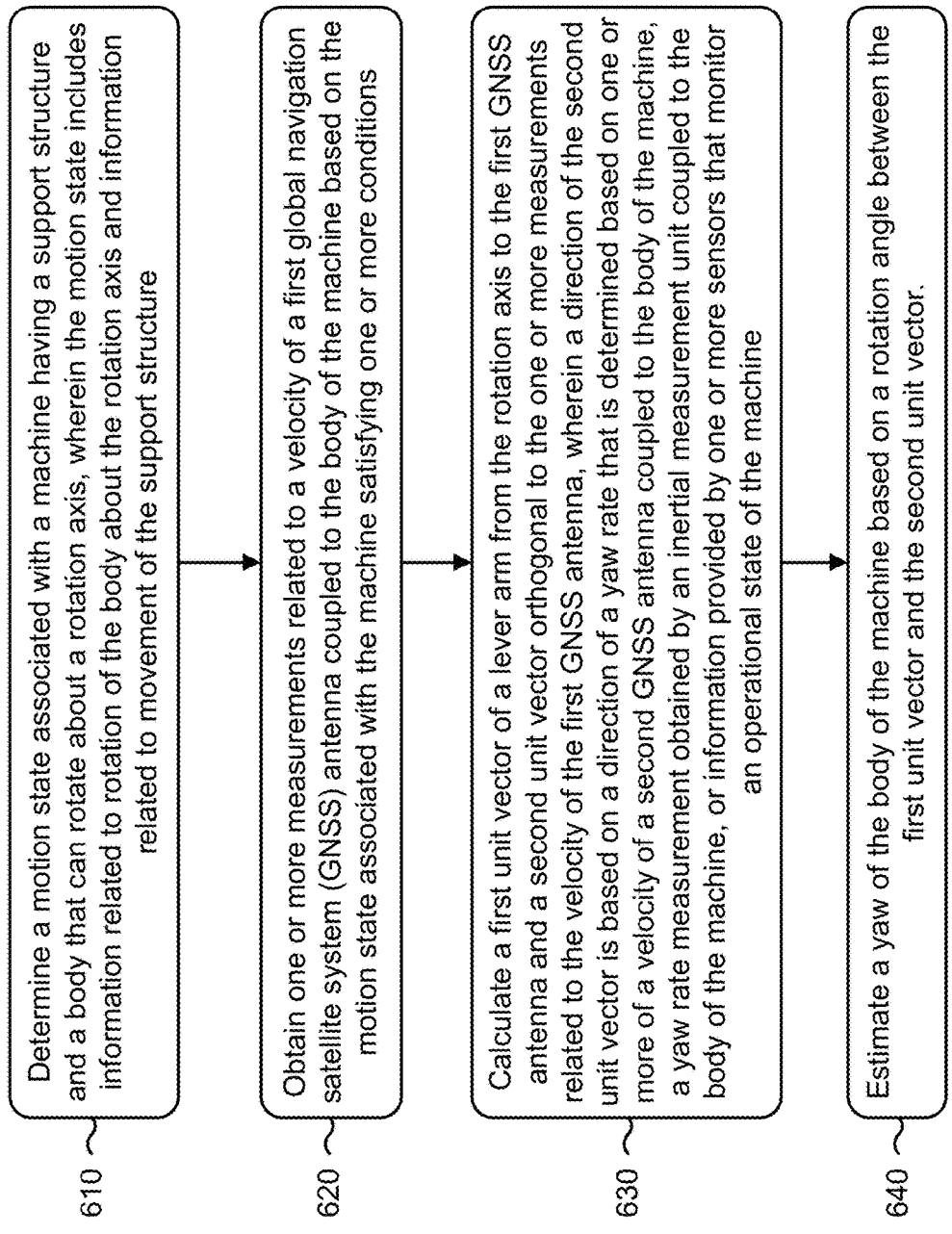
FIG. 6 is a flow chart of an example process for estimating yaw of a rotating body of a machine using velocity measurements.

FIG. 6 is a flow chart of an example process 600 for estimating yaw of a rotating body of a machine using velocity measurements. In some implementations, one or more process blocks of FIG. 6 may be performed by a yaw estimation device (e.g., yaw estimation device 210). In some implementations, one or more process blocks of FIG. 6 may be performed by another device or a group of devices separate from or including the yaw estimation device, such as a GNSS receiver including one or more GNSS antennas (e.g., a GNSS receiver including GNSS antenna(s) 212), an IMU (e.g., IMU 214), a sensor, and/or the like.

As shown in FIG. 6, process 600 may include determining a motion state associated with a machine having a support structure and a body that can rotate about a rotation axis, wherein the motion state includes information related to rotation of the body about the rotation axis and information related to movement of the support structure (block 610). For example, the yaw estimation device (e.g., using a processor, memory, storage component, input component, output component, communication interface, and/or the like) may determine a motion state associated with a machine having a support structure and a body that can rotate about a rotation axis, as described above. In some implementations, the motion state includes information related to rotation of the body about the rotation axis and information related to movement of the support structure.

As further shown in FIG. 6, process 600 may include obtaining one or more measurements related to a velocity of a first GNSS antenna coupled to the body of the machine based on the motion state associated with the machine satisfying one or more conditions (block 620). For example, the yaw estimation device (e.g., using a processor, memory, storage component, input component, output component, communication interface, and/or the like) may obtain one or more measurements related to a velocity of a first GNSS antenna coupled to the body of the machine based on the motion state associated with the machine satisfying one or more conditions, as described above.

As further shown in FIG. 6, process 600 may include calculating a first unit vector of a lever arm from the rotation axis to the first GNSS antenna and a second unit vector orthogonal to the one or more measurements related to the velocity of the first GNSS antenna, wherein a direction of the second unit vector is based on a direction of a yaw rate that is determined based on one or more of a velocity of a second GNSS antenna coupled to the body of the machine, a yaw rate measurement obtained by an inertial measurement unit coupled to the body of the machine, or information provided by one or more sensors that monitor an operational state of the machine (block 630). For example, the yaw estimation device (e.g., using a processor, memory, storage component, input component, output component, communication interface, and/or the like) may calculate a first unit vector of a lever arm from the rotation axis to the first GNSS antenna and a second unit vector orthogonal to the one or more measurements related to the velocity of the first GNSS antenna, as described above. In some implementations, a direction of the second unit vector is based on a direction of a yaw rate that is determined based on one or more of a velocity of a second GNSS antenna coupled to the body of the machine, a yaw rate measurement obtained by an inertial measurement unit coupled to the body of the machine, or information provided by one or more sensors that monitor an operational state of the machine.

As further shown in FIG. 6, process 600 may include estimating a yaw of the body of the machine based on a rotation angle between the first unit vector and the second unit vector (block 640). For example, the yaw estimation device (e.g., using a processor, memory, storage component, input component, output component, communication interface, and/or the like) may estimate a yaw of the body of the machine based on a rotation angle between the first unit vector and the second unit vector, as described above.

Process 600 may include additional implementations, such as any single implementation or any combination of implementations described below and/or in connection with one or more other processes described elsewhere herein.

In a first implementation, the motion state associated with the machine satisfies the one or more conditions when the body is rotating about the rotation axis while the support structure is stationary.

In a second implementation, alone or in combination with the first implementation, the motion state associated with the machine satisfies the one or more conditions when the body is rotating about the rotation axis at a first speed that satisfies a first threshold while the support structure is moving at a second speed that satisfies a second threshold.

In a third implementation, alone or in combination with one or more of the first and second implementations, the yaw estimation device may determine a position of the first GNSS antenna and estimate a pose of an implement coupled to the body of the machine based on the yaw of the body of the machine and the position of the first GNSS antenna.

In a fourth implementation, alone or in combination with one or more of the first through third implementations, the motion state associated with the machine is determined based on one or more of an input from the one or more sensors that monitor the operational state of the machine, a comparison between a direction of the velocity of the first GNSS antenna and a direction of the velocity of the second GNSS antenna, or the yaw rate measurement obtained by the inertial measurement unit.

In a fifth implementation, alone or in combination with one or more of the first through fourth implementations, the direction of the second unit vector is towards the rotation axis.

In a sixth implementation, alone or in combination with one or more of the first through fifth implementations, the one or more measurements related to the velocity of the first GNSS antenna are based on a Doppler frequency shift associated with one or more satellite signals received at the first GNSS antenna.

In a seventh implementation, alone or in combination with one or more of the first through sixth implementations, obtaining the one or more measurements related to the velocity of the first GNSS antenna includes determining a first position of the first GNSS antenna at a first time based on a first set of satellite signals received by the first GNSS antenna and determining a second position of the first GNSS antenna at a second time based on a second set of satellite signals received by the first GNSS antenna, wherein the velocity of the first GNSS antenna is based on a distance between the first position and the second position and a difference between the first time and the second time.

In an eighth implementation, alone or in combination with one or more of the first through seventh implementations, the yaw estimation device may calculate a third unit vector of a lever arm from the rotation axis to the second GNSS antenna and a fourth unit vector that is orthogonal to the velocity of the second GNSS antenna in a direction towards the rotation axis, and calculate a rotation angle between the third unit vector and the fourth unit vector, wherein the yaw of the body of the machine is based on a mean of the rotation angle between the first unit vector and the second unit vector and the rotation angle between the third unit vector and the fourth unit vector.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

The yaw estimation techniques disclosed herein may be used with any machine that has a body that can rotate about a rotation axis, and can be used to establish an accurate estimate of a pose that includes a position and an orientation (e.g., an angle based on roll, pitch, and yaw) for one or more components of the machine based on a velocity at a fixed point on the machine (e.g., a location of a GNSS antenna). For example, because the body can rotate about the rotation axis independently of movement of an underlying support structure, the body may have a yaw (or heading) that differs from the underlying support structure. Accordingly, the yaw estimation techniques described herein can be used to accurately estimate the orientation of the body and certain components (e.g., a work implement) coupled to the body, which may enable the machine to more accurately carry out a work plan (e.g., to dig and hold a grade at a centimeter-level accuracy), avoid collisions with obstacles (e.g., other machines, terrain features, and/or the like), autonomously or semi-autonomously operate and/or control movement of the machine, and/or the like.

Furthermore, when the machine has a support structure with a traction system or other system to propel the machine forwards, backwards, and/or the like, motion, if any, of the support structure can be taken into account when determining whether to estimate the pose of the one or more components of the machine using the yaw estimation techniques described herein or another technique (e.g., dead reckoning, a conventional method that may be less accurate than the yaw estimation techniques described herein but suitable for conditions when the support structure is moving and/or the body is not rotating, and/or the like). In this way, the yaw estimation techniques described herein can be used in a standalone configuration and/or in conjunction with one or more other pose estimation techniques. For example, an output from the yaw estimation device 210 described above can be fused with a Kalman filter that uses a series of measurements over time to produce position estimates, orientation estimates, and/or the like that are more accurate and/or tolerant of error than any single measurement. For example, the yaw estimation techniques described herein may be used if the body of the machine is rotating at a fast rate, and a dead reckoning technique, a position vector-based technique, and/or the like can be used if the body of the machine is not rotating or rotating at a relatively slow rate, and results from the various techniques can be blended over time to produce more accurate results.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method for estimating a yaw estimate of a machine, comprising:
   determining, by one or more processors, a motion state associated with the machine having a support structure and a body that can rotate about a rotation axis wherein the motion state includes information related to rotation of the body about the rotation axis and information related to movement of the support structure;
   obtaining, by the one or more processors, one or more measurements related to a velocity of a first global navigation satellite system (GNSS) antenna coupled to the body of the machine based on the motion state associated with the machine satisfying one or more conditions;
   calculating, by the one or more processors, a first unit vector of a lever arm from the rotation axis to the first GNSS antenna;
   calculating a second unit vector based on and orthogonal to the one or more measurements related to the velocity of the first GNSS antenna, wherein while calculating the second unit vector; a direction of orthogonality is applied and is based on determining a direction of a yaw rate that in turn is determined based on one or more of a velocity of a second GNSS antenna coupled to the body of the machine and a yaw rate measurement obtained by an inertial measurement unit coupled to the body of the machine; and
   estimating, by the one or more processors, the yaw estimate of the body of the machine based on a rotation angle between the first unit vector and the second unit vector.

2. The method of claim 1, wherein the motion state associated with the machine satisfies the one or more conditions when the body is rotating about the rotation axis while the support structure is stationary.

3. The method of claim 1, wherein the motion state associated with the machine satisfies the one or more conditions when the body is rotating about the rotation axis at a first speed that satisfies a first threshold while the support structure is moving at a second speed that satisfies a second threshold.

4. The method of claim 1, further comprising: determining a position of the first GNSS antenna; and estimating a pose of an implement coupled to the body of the machine based on the yaw of the body of the machine and the position of the first GNSS antenna.

5. The method of claim 1, wherein the motion state associated with the machine is determined based on one or more of an input from the one or more sensors that monitor the operational state of the machine, a comparison between a direction of the velocity of the first GNSS antenna and a direction of the velocity of the second GNSS antenna, or the yaw rate measurement obtained by the inertial measurement unit.

6. The method of claim 1, wherein the direction of the second unit vector is towards the rotation axis.

7. The method of claim 1, wherein the one or more measurements related to the velocity of the first GNSS antenna are based on a Doppler frequency shift associated with one or more satellite signals received at the first GNSS antenna.

8. The method of claim 1, wherein obtaining the one or more measurements related to the velocity of the first GNSS antenna includes:
  determining a first position of the first GNSS antenna at a first time based on a first set of satellite signals received by the first GNSS antenna; and determining a second position of the first GNSS antenna at a second time based on a second set of satellite signals received by the first GNSS antenna,
  wherein the velocity of the first GNSS antenna is based on a distance between the first position and the second position and a difference between the first time and the second time.

9. The method of claim 1, further comprising: calculating a third unit vector of a lever arm from the rotation axis to the second GNSS antenna and a fourth unit vector that is orthogonal to the velocity of the second GNSS antenna in a direction towards the rotation axis; and calculating a rotation angle between the third unit vector and the fourth unit vector, wherein the yaw of the body of the machine is based on a mean of the rotation angle between the first unit vector and the second unit vector and the rotation angle between the third unit vector and the fourth unit vector.

10. A system for determining a yaw estimate of a machine, comprising:
  one or more memories; and
  one or more processors, communicatively coupled to the one or more memories, configured to:
  determine a motion state associated with the machine having a body that can rotate about a rotation axis, the motion state including information related to rotation of the body about the rotation axis and information related to movement of a support structure supporting the body;
  obtain one or more measurements related to a velocity of a first global navigation satellite system (GNSS) antenna coupled to the body of the machine based on the motion state associated with the machine satisfying one or more conditions,
  wherein the one or more conditions include that the body is rotating about the rotation axis;
  calculate a first unit vector of a lever arm from the rotation axis to the first GNSS antenna;
  calculate a second unit vector based on and orthogonal to the one or more measurements related to the velocity of the first GNSS antenna, wherein while calculating the second unit vector; a direction of orthogonality is applied to the second unit vector and is based on determining a direction of a yaw rate that is determined based on one or more of a velocity of a second GNSS antenna coupled to the body of the machine or a yaw rate measurement obtained by an inertial measurement unit coupled to the body of the machine; and
  estimate the yaw estimate of the body of the machine based on a rotation angle between the first unit vector and the second unit vector.

11. The system of claim 10, wherein the motion state associated with the machine satisfies the one or more conditions when the body is rotating about the rotation axis while a support structure of the machine is stationary.

12. The system of claim 10, wherein the motion state associated with the machine satisfies the one or more conditions when the body is rotating about the rotation axis at a first speed that satisfies a first threshold while a support structure of the machine is moving at a second speed that satisfies a second threshold.

13. The system of claim 10, wherein the motion state associated with the machine is determined based on one or more of an input from a device that monitors an operational state of the machine, a comparison between a direction of the velocity of the first GNSS antenna and a direction of the velocity of the second GNSS antenna, or the yaw rate measurement obtained by the inertial measurement unit.

14. The system of claim 10, wherein the one or more measurements related to the velocity of the first GNSS antenna are based on a Doppler frequency shift associated with one or more satellite signals received at the first GNSS antenna.

15. The system of claim 10, wherein the one or more processors, when obtaining the one or more measurements related to the velocity of the first GNSS antenna, are further configured to:
  determine a first position of the first GNSS antenna at a first time based on a first set of satellite signals received by the first GNSS antenna; and
  determine a second position of the first GNSS antenna at a second time based on a second set of satellite signals received by the first GNSS antenna,
  wherein the velocity of the first GNSS antenna is based on a distance between the first position and the second position and a difference between the first time and the second time.

16. The system of claim 10, wherein the one or more processors are further configured to:
  calculate a third unit vector of a lever arm from the rotation axis to the second GNSS antenna and a fourth unit vector that is orthogonal to the velocity of the second GNSS antenna in a direction towards the rotation axis; and
  calculate a rotation angle between the third unit vector and the fourth unit vector,
  wherein the yaw of the body of the machine is based on a mean of the rotation angle between the first unit vector and the second unit vector and the rotation angle between the third unit vector and the fourth unit vector.

17. A machine, comprising:
  a body that can rotate about a rotation axis;
  a support structure capable of movement; and
  a system including one or more devices configured to:
  determine a motion state associated with the machine, wherein the motion state includes one or more of information related to rotation of the body about the rotation axis or information related to movement of the support structure;
  obtain one or more measurements related to a velocity of a first global navigation satellite system (GNSS)

antenna coupled to the body of the machine based on the motion state associated with the machine satisfying one or more conditions;

calculate a first unit vector of a lever arm from the rotation axis to the first GNSS antenna;

calculate a second unit vector based on and orthogonal to the one or more measurements related to the velocity of the first GNSS antenna, wherein while calculating the second unit vector, a direction of orthogonality is applied to the second unit vector and is determined based on one or more of a velocity of a second GNSS antenna coupled to the body of the machine or a yaw rate measurement obtained by an inertial measurement unit coupled to the body of the machine; and estimate a yaw estimate of the body of the machine based on a rotation angle between the first unit vector and the second unit vector.

18. The machine of claim 17, wherein the motion state associated with the machine satisfies the one or more conditions when the body is rotating about the rotation axis while the support structure is stationary, or when the body is rotating about the rotation axis at a first speed that satisfies a first threshold while the support structure is moving at a second speed that satisfies a second threshold.

19. The machine of claim 17, wherein the motion state associated with the machine is determined based on one or more of an input from a device that monitors an operational state of the machine, a comparison between a direction of the velocity of the first GNSS antenna and a direction of the velocity of the second GNSS antenna, or the yaw rate measurement obtained by the inertial measurement unit.

20. The machine of claim 17, further comprising: an implement coupled to the body of the machine, wherein the one or more devices are further configured to estimate a pose of the implement based on the yaw of the body of the machine and a position of the first GNSS antenna.

* * * * *